Aug. 18, 1964     H. R. FEHLING ETAL     3,145,286
METHOD AND APPARATUS FOR PREPARING CRATERED BALLS
Original Filed May 17, 1960     5 Sheets—Sheet 1

INVENTORS
HANS REINHARD FEHLING
EDWARD HENRY HARVEY
BY
ATTORNEYS

Aug. 18, 1964     H. R. FEHLING ETAL     3,145,286
METHOD AND APPARATUS FOR PREPARING CRATERED BALLS
Original Filed May 17, 1960                5 Sheets-Sheet 2

INVENTORS
HANS REINHARD FEHLING
EDWARD HENRY HARVEY

ATTORNEYS

INVENTORS
HANS REINHARD FEHLING
EDWARD HENRY HARVEY
ATTORNEYS

INVENTORS
HANS REINHARD FEHLING
EDWARD HENRY HARVEY
BY
Brumbaugh, Free, Graves & Donohue
ATTORNEYS Aug. 18, 1964    H. R. FEHLING ETAL    3,145,286
METHOD AND APPARATUS FOR PREPARING CRATERED BALLS
Original Filed May 17, 1960                 5 Sheets-Sheet 5
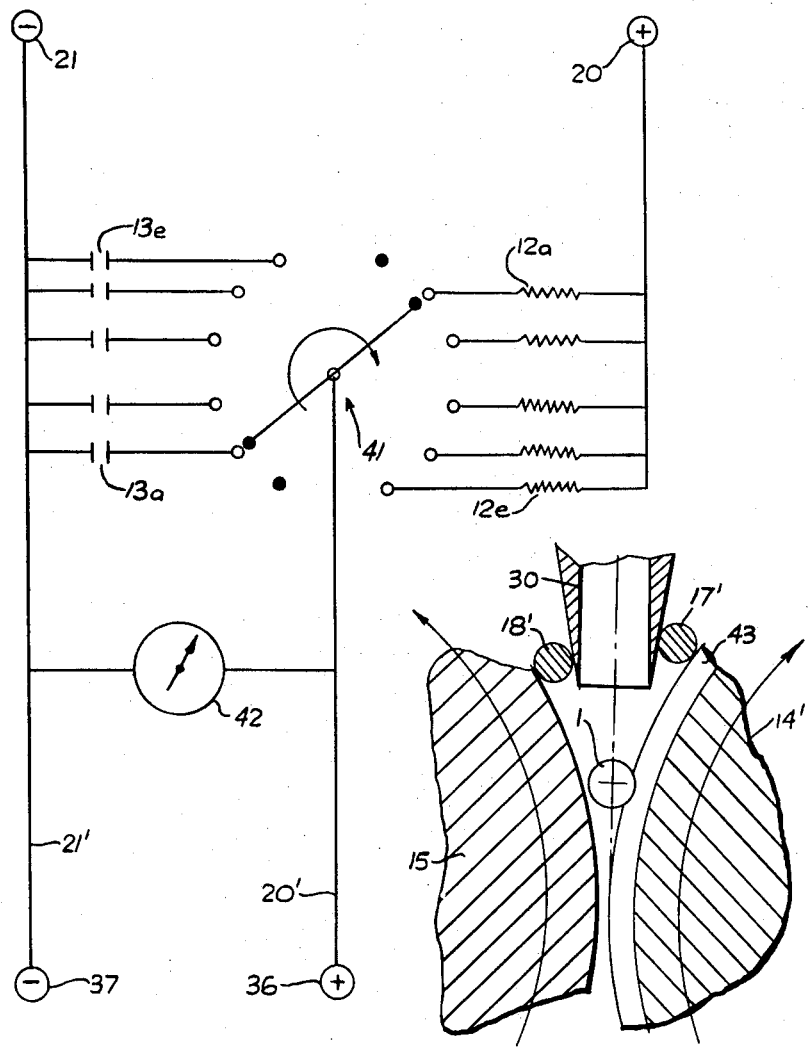
Fig. 11.   Fig. 13.
Fig. 12
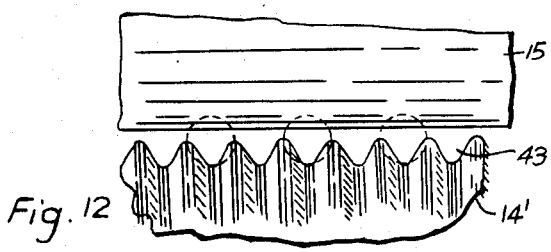
INVENTORS
HANS REINHARD FEHLING
EDWARD HENRY HARVEY
BY
ATTORNEYS

3,145,286
METHOD AND APPARATUS FOR PREPARING CRATERED BALLS

Hans Reinhard Fehling, Zug, Switzerland, and Edward Henry Harvey, Finchley, England, assignors to I.R.C. Limited, London, England, a company of Great Britain
Original application May 17, 1960, Ser. No. 29,608. Divided and this application Nov. 20, 1961, Ser. No. 154,929
9 Claims. (Cl. 219—69)

This invention concerns writing instruments of the ball-tip type wherein the writing extremity or "nib" comprises a writing ball rotatably housed in a socket or housing which provides a base seat or other thrust bearing (against which the ball may thrust during the writing operation) and is so shaped that the ball cannot drop out when the instrument is lifted from the writing surface, the ball being supplied with ink from a reservoir by way of a small bore feed duct leading to the back of the ball so that as the ball is rotated by being moved over and in contact with a writing surface (such, for example, as a sheet of paper) a thin film of ink is carried by the ball through the narrow gap between ball and housing and is deposited as a writing trace on said surface. In general, the bearing surfaces or seating surfaces provided in the housing for the ball are part spherical and comprise a part-spherical lateral seating surrounding the ball in the region of or above the ball equator and a part-spherical base seat. The base seat may be circumferentially continuous, or it may be discontinuous being divided by at least one ink channel or groove leading outwards from the end of the feed duct; it may merge, without interruption, into a part of the lateral seat disposed below the ball equator or may be separated from that part by a ball encircling cavity; the ink channel, or each of them, may communicate with this cavity. Typical designs of housing are shown in British patent specifications Nos. 564,172 and 609,817.

Practical considerations in an instrument intended for writing by hand on paper render it desirable to use a writing ball which is not less than 0.75 mm. and not greater than 1.25 mm. in diameter, and the great majority of ball pens in use at present employ a highly polished, preferably stainless, steel ball of 0.8 to 1.0 mm. diameter. As the uniformity of the writing trace largely depends on the uniformity of the clearance between the rotating ball and its seating surfaces in the housing, particularly the lateral seating, balls for ball point pens have to be manufactured to a maximum deviation from true sphericity of not more than ±0.0005 mm. The production of a mirror polish on the ball surface is, therefore, highly desirable in order to facilitate and maintain this extreme accuracy in mass production.

It has long been known that such a polish might be undesirable in use as the film of ink breaks up more easily on such surface and the ball itself has a greater tendency to skid on the writing surface. It has also been suggested that a roughened or pitted ball would assist in conveying ink from the interior of the housing to the writing surface.

Many proposals have, therefore been made to use balls the surface of which is roughened, pitted, striated or porous. Various mechanical, chemical and electrolytical methods have been suggested to produce balls having such characteristics.

However, these proposals have not led to any striking or lasting improvements in performance.

The conversion of a polished ball surface into "satin finish" by mild etching or mechanical means is simple and reliable. Such a surface is demonstrably much superior to a polished surface in preventing a thin film of ink from breaking up into gloubies. But the improvement in writing performance is surprisingly small, and also transient as such a finish is rapidly destroyed or altered by the abrasive action of the paper on the ball during writing.

The production of the ball with a surface corresponding to a "fine lap" is also possible without difficulty. In certain circumstances it may produce a better trace. But such a surface has a degree of roughness which is apt to increase the wear of the softer nib material and, therefore, is self defeating. Proposals have been made to burnish such a lapped surface in order to diminish or eliminate this cutting action and restore a spherical shape over a large fraction of the ball surface. While this is feasible it also tends to reduce the improvement, if any, in the trace to that of a "satin finish."

Hence the designers of ball point pens desirous of obtaining a deep continuous trace and unable to do so by increasing the ink carrying capacity of the ball, had to fall back on methods of widening the initial clearance between the ball and its housing and to develop inks of very high dye concentration (up to 40 percent) and of correspondingly high optical density.

While generally much more successful than "rough" balls, large initial clearances have other drawbacks. In the first place, great skill and exceptional tool maintenance is needed to produce them reliably in the large quantities now required by the writing public. But the intrinsic disadvantage of a large clearance lies in the greater freedom of eccentric movement or displacement of the ball within the housing and its spherical bearing surfaces. This freedom tends to increase the differences in the thickness of the ink film emerging from the housing, and to facilitate the entrainment of air into the housing with the re-entering surface of the ball when the latter is partly or wholly denuded of ink.

Hence, while the trace deepens with an increased clearance, common faults like the accumulation of surplus ink on the rim of the nib ("spotting," messiness) and the interruptions in the continuity of the trace, particularly on changes in the direction of the stroke ("skipping") are more difficult to avoid. Many users will also object that such a pen will write "too freely" in the sense that the extremely small friction created by the movement of the ball during writing induces a lack of "control" resulting in bad handwriting.

It is one object of the present invention to overcome these difficulties by creating a ball with a substantially increased ink-carrying capacity but without the drawbacks mentioned. Therefore, as viewed from one aspect, the present invention provides a writing ball, suitable for use in the writing extremity of a ball-tip writing instrument of the type specified, consisting of a sphere which has craters of substantially uniform area dispersed over its whole surface; preferably, these craters should not be substantially larger in diameter than 70 microns and not substantially smaller than 10 microns. Preferably, for a 1 mm. ball, the craters should take up about half of the ball surface and have a diameter between 30 and 50 microns or about one-tenth to one-hundredth the diameter of the ball, whereas the remainder of the surface should be truly spherical and have a very high finish.

It is another object of the invention to provide an improved writing extremity or "nib," in or for an instrument of the type specified, incorporating a writing ball of increased ink-carrying capacity and therefore the invention, as viewed from another aspect, provides a writing extremity in or for an instrument of the type specified, equipped with a cratered writing ball having the features specified in the preceding paragraph, the arrangement being such that the quantity of ink deposited on a writing surface in normal writing is increased by at least 50 percent when compared with an uncratered ball of the same size in the same nib.

It is a further object of the invention to provide a new method of manufacturing writing balls of increased ink-carrying capacity. Therefore, the invention, as viewed from a further aspect, provides in the manufacture of a writing ball for a writing instrument of the type specified the step of producing, by electrical spark erosion, a multiplicity of craters of substantially uniform individual area dispersed over the whole surface of the electrically conducting ball, such craters being formed individually by a single spark of predetermined electrical energy. Preferably the individual spark is produced by the discharge of a condenser of predetermined capacitance, said condenser being automatically recharged in a known manner from a supply of direct current at constant voltage.

One of the principal objects of the present invention is to provide means by which the quantity of ink transferred by the ball from the interior of the housing to the writing surface can be substantially increased without having to increase the radial clearance between the ball surface and its spherical bearing surfaces in the housing. But it has been found that this object will only be fully achieved by the present invention if care is taken to select the right combination between crater size, surface coverage and the viscosity of the ink.

This will be more easily appreciated by examining the factors determining the thickness of an ink trace produced by a ball point pen.

If a ball is retained in its housing by peening, rolling, swaging or spinning the rim over the surface of the ball until a proper spherical bearing surface is produced on the housing walls adjacent to the rim, the elastic stresses built up in these walls during this operation will relax when the latter is completed. In consequence, the ball is not jammed in its housing and rolls freely but the clearance between them is very small. A trace produced by such a pen, if properly manufactured, will have an average thickness of 0.1 to 0.2 micron, which is much too low a value to produce a fully acceptable uniform trace.

Various methods have therefore been developed in the past to increase this clearance by a second operation. But it has been the general experience that while this greatly reduces the "stiffness" of the ball point pen it cannot open up the clearance to produce a trace of more than 0.5 to 0.6 micron without deforming the spherical shape of the internal bearings produced in the first operation. Such a deformation results in an inferior non-uniform trace.

All these methods have one thing in common, that the trace thickness is almost entirely dependent on the ball clearance, whereas the influence of the viscosity, within the acceptable range, is small. As there is always a certain degree of slip between the ball surface and the writing surface in the act of writing, the transfer of ink from the former to the latter is at least partly done by a wiping action.

The present invention adds to the carrying capacity of the clearance that of the craters. The capacity of the craters can be increased to at least twice that of the clearance by increasing the surface coverage of the craters and/or their individual size. Trace thicknesses have thus been increased to as much as 2.0 microns, which is in fact considerably more than is required for most purposes. There is, therefore, a wide freedom of choice for obtaining the desired trace thickness without any deterioration in its quality.

On the other hand, the transfer of ink from the craters to the writing surface will be mainly by a "blottting" rather than a "wiping" action. For this reason the influence of the viscosity is considerable.

The inks at present used in satisfactory ball point pens with uncratered balls have a viscosity of not less than about 80–100 poises at 25° C. (corresponding to about 300–400 poises at 15° C. and 40–50 poises at 30° C.). It has been found that a lower viscosity, while producing a greater ease of writing and a more liberal ink flow, also increases the objectional tendency of a ball pen to produce visible irregularities in the amount of ink deposited along the trace. One such fault is known as "spotting" and consists of depositing an additional drop or "spot" of ink when the trace changes its direction rather sharply as in the upper loop of the letter "e."

It has now been found that this tendency practically vanishes over the whole viscosity range from 10 poises upwards when cratered balls are used according to the invention. On the other hand, it was also found that the efficiency of the craters as ink carriers decreases as the viscosity increases within the same viscosity range. The reason is also certainly the inability of the ball to empty the craters of ink in rapid contact with the writing surface if the viscosity is too high. Experiments with present types of ink show that if the viscosity in increased about 200 poises at room temperature (temperature of writing), ball cratering becomes ineffective, as will be illustrated by the following example for standard nib with 1 mm. balls:

| Viscosity at temperature of writing in Poises | 1 | 20 | 40 | 80 | 120 | 160 | 200 |
|---|---|---|---|---|---|---|---|
| Approximate Trace thickness in Microns: | | | | | | | |
| (a) Uncratered ball | 0.6 | 0.6 | 0.6 | 0.6 | 0.55 | 0.5 | 0.45 |
| (b) Cratered ball (40% coverage, crater depth of 5.5 to 6.0 microns) | 1.2 | 1.15 | 1.1 | 1.0 | 0.85 | 0.75 | 0.65 |

The best results are generally achieved by selecting the highest ink viscosity which will still give the desired trace thickness.

In order to produce complete uniformity in the depth of the trace along its length (no visible surplus or deficiency of ink, it is desirable to increase the consumption of present day nibs by at least 50%. In the above example this could still be achieved with an ink viscosity of about 100 poises at the temperature of writing, which is about half the lowest viscosity at which a standard nib still maintains its best performance. On the other hand, the viscosity is still high enough to obviate any messiness of the nib due to leakage.

It will be appreciated therefore that, if the surface coverage and the crater diameter is increased, the same increases in consumption as in the above example could be obtained with higher viscosities. For a typical ball point ink, the following sets of conditions all produced a trace thickness of about 1 micron, i.e., the same relative increase in ink consumption by 60 to 70% over a good standard nib with an uncratered ball of 1 mm. diameter.

| | | | |
|---|---|---|---|
| Surface coverage of craters, percent | 35 | 40 | 50 |
| Condenser capacity in circuit used to produce craters, mfd. | 0.03 | 0.1 | 0.25 |
| Average crater dimensions: | | | |
| Diameter, Microns | 25 | 40 | 50 |
| Depth, Microns | 5.0 | 5.7 | 6.2 |
| Ink carrying capacity of craters in terms of equivalent film thickness on a smooth ball, Microns | 0.6 | 0.8 | 1.0 |
| Approximate average distance apart of craters, Microns | 15 | 20 | 17 |
| Approximate number of craters per ball | 2,200 | 1,000 | 800 |
| Ink viscosity at the average temperature of writing, Poises | 25 | 80 | 120 |

While there is, therefore, a wide choice of conditions which can be selected to achieve a certain result and which can also be controlled in manufacture, the following ranges are preferred.

Surface coverage of
  craters _____ Between 30 and 50%.
Crater diameter _____ Between 30 and 50 microns.
Ink viscosity at the temperature of writing _____ Between 40 and 100 poises.
Corresponding viscosity at a reference temperature of 25° C. of an ink for use in:
  (a) Temperate climate (room temperature 15° C.) _____ Between 10 and 30 poises.
  (b) Hot climate room temperature 30° C.) Between 80 and 200 poises.

These ranges have so far given the best all-around performance for a normal ball point writing instrument with a 1 mm. ball. However, those skilled in the art will have no difficulty in modifying these conditions where the invention is to be adapted to a special requirement.

The preferred ranges and the trace thickness obtained are given as a guide and cannot have any absolute value because the actual ink consumption or trace thickness is also governed by factors over which the present invention has no influence. Foremost among them are:

(1) The handwriting characteristics as well as the preference of individual writers, which vary widely;
(2) The physical nature of the writing surface, in particular its absorption characteristics.

From this aspect, the invention consists in a ball point pen having a nib with a cratered ball and a reservoir charged with a suitable ink the viscosity of which does not exceed 200 poises at the normal temperature of use in writing. Preferably the ball should have craters of a diameter between 30 and 50 microns covering between 30 and 50% of the ball surface and the ink should have a viscosity range of 40 to 100 poises at the normal temperature of writing.

In order that the invention may be better understood, reference will now be made to the accompanying drawings in which.

Figure 7A:
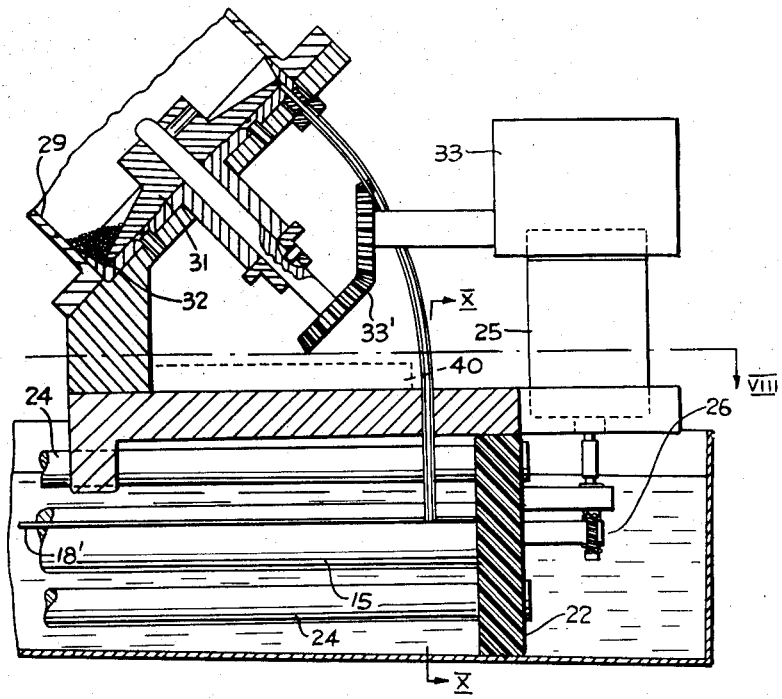
Figure 7B:
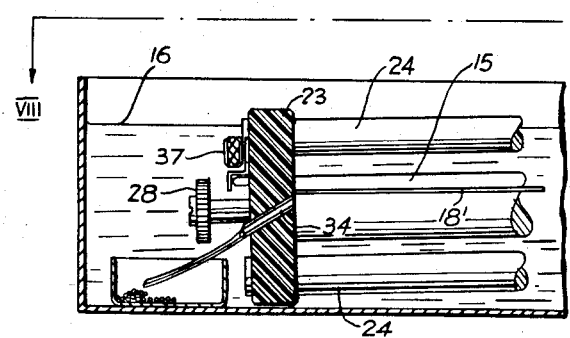
Figure 8:
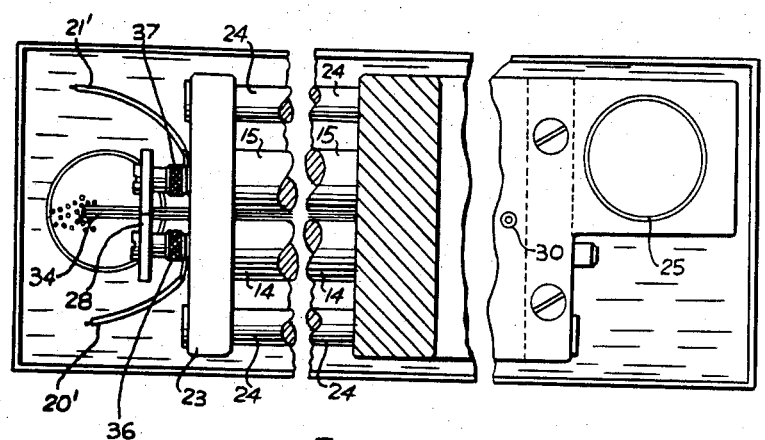
Figure 9:
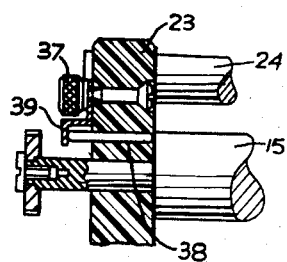
Figure 10:
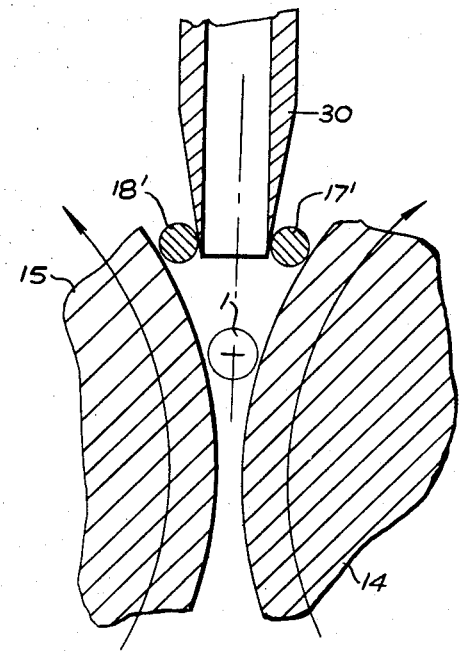

FIGS. 7A and 7B jointly show, in sectional elevation, apparatus according to this invention;

FIG. 8 is a sectional plan view thereof partly broken away, taken on the line VIII—VIII in FIGS. 7A and 7B;

FIG. 9 shows a detail;

FIG. 10 is a section taken on the line X—X in FIG. 7A but on a larger scale;

FIG. 11 shows the electrical circuit; and

FIGS. 12 and 13 show a modification of the apparatus.

Figures 1, 2, 3:
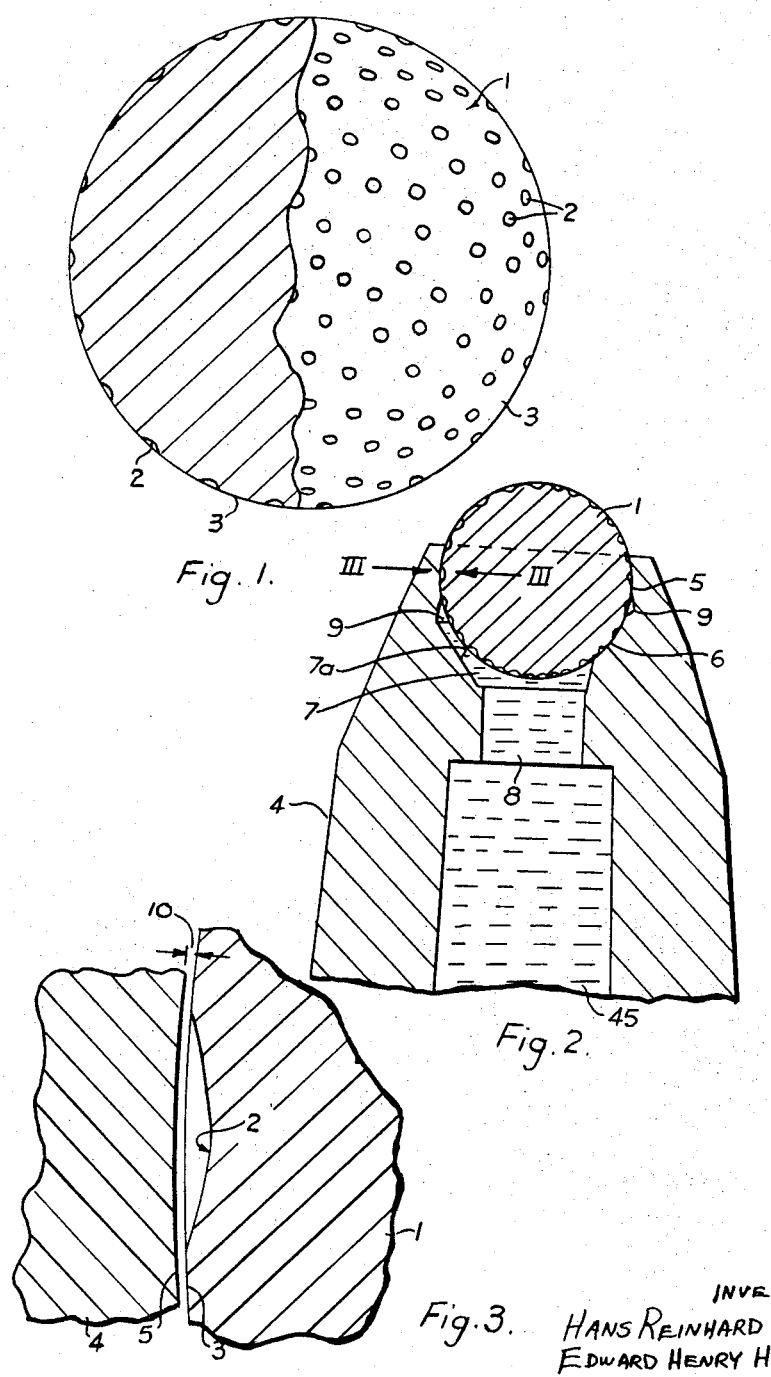
FIG. 1 shows, partly in section and partly in elevation, a cratered ball according to this invention.
FIG. 2 is a sectional view of the relevant portion of a writing extremity equipped with a cratered ball according to this invention.
FIG. 3 is a sectional view, on a greatly enlarged scale, taken on the line III—III in FIG. 2.

FIG. 1 illustrates a cratered ball 1 of approximately 1 mm. diameter. The craters 2 are distributed at random over the smooth spherical surface 3 of the ball, which may be highly polished or have a "satin finish." The craters may cover one-fifth to two-thirds of the total surface area, but best results are obtained with a cratered area of about half the surface area. It will be appreciated that a balance must be kept between the ink-carrying capacity of the craters and the smooth bearing area of the uncratered surface. The diameter of the craters of a 1 mm. ball should preferably be not less than 10 microns (otherwise the ink-carrying capacity of the craters becomes too small to be really useful) and not larger than 70 microns (otherwise the local deviation from the overall spherical shape of the ball is too large and the smooth rotation of the ball over the bearing surfaces of its housing is impaired). With a larger ball, the craters may be of larger diameter since the area of the bearing surfaces is correspondingly increased and the curvature is reduced. As described above, the best results have been obtained with craters of 30 to 50 microns diameter when using a cratered steel ball of 1 mm. diameter in a die-cast tin alloy nib with a viscous ink of about 40–100 poises at 25° C.

FIG. 2 shows a ball point pen nib 4 with a cratered ball 1 according to the invention and an essential feature of the construction is shown in FIG. 3 on a greatly enlarged scale. The nib itself may be die-cast in tin alloy, as described in British patent specification No. 769,296. The ball 1 is held laterally by a part-spherical lateral seat 5 which encircles it above and below the ball equator, and the writing pressure on the ball is taken by a part-spherical base seat 6 sub-divided into circumferentially-spaced areas by the apices 7a of a triangular enlargement 7 of the end portion 8 of the feed duct. These apices 7a extend outwards beyond the periphery of the base seat 6 and communicate with an ink cavity 9 which surrounds the ball 1 between the base seat and the lateral seat. The ink is indicated at 45.

As shown in FIG. 3, between the smooth spherical surface 3 of the ball and the lateral seat 5 there is a radial clearance or gap 10 through which ink is carried in shear by the rotation of the ball. In addition, the craters 2 carry ink bodily from the housing to the writing surface, irrespective of the size of the radial clearance.

The importance of this will be better appreciated from the following consideration:

As the ink film filling the radial clearance 10 is sheared between the moving spherical surface 3 of the ball 1 and the stationary spherical surface of the lateral seat 5, it follows that the ink film carried by the ball surface once it has emerged from the housing is only half as thick (excluding craters) as the film filling the clearance 10.

On the other hand, the ink in the craters 2 is not (or not to the same extent) subject to the shear mentioned and is, therefore, carried bodily with the ball. Hence the craters, though only occupying part of the ball surface, are very effective ink carriers in terms of the amount actually deposited as a trace on the writing surface. The further advantages are that the amount carried in the craters is entirely independent of the changing radial clearance between the ball and its seatings and that any surplus of ink not taken up by the paper is carried back into the housing without being scraped off by and deposited on the rim of the housing. At the same time, the smaller radial clearance of the nib according to the invention, when compared with a conventional nib producing the same depth of trace, together with the ink retaining characteristics of the craters, ensures that far less air is entrained into the interior of the nib by the rotating ball.

FIG. 3 also explains another, and at first surprising, feature of the invention, viz., that craters as large as 50 microns in diameter, if surrounded by a perfectly smooth spherical surface, do not impair those writing characteristics of the nib which are conditioned by a smooth rotation of the ball over a well lubricated bearing. If FIG. 3 is interpreted as an illustration of part of a spherical base seating it will be seen that when the ball is pressed into the latter the ink in the crater is trapped by the matching spherical surfaces of the ball and of the seat surrounding it. Hence, the ink in such a crater is capable of forming a pressurized liquid cushion which is, of course, the very condition of a lubricating film. For this reason, it is not correct that a ball with 50% cratered area has thereby lost half its bearing surface. This would only be true if the single craters were too large or if they were not evenly dispersed so that a substantial number of such craters would merge. On the other hand, if half the surface of a 1 mm. ball is formed according to the invention by craters not substantially exceeding 50 microns in diameter, and if the average dimension of the individual spherical base seatings is not much less than 200 microns so that the ratio of the area of each base seat to the area of each crater is greater than about twenty to one, it can be shown that more than half of the craters within the base seat area take full part in forming the lubricating film supporting the ball.

All these features combine to produce an improved ballpoint pen nib with an exceptionally uniform and continuous deep trace, but without the messiness or other common faults exhibited by known ball point pens.

This will be appreciated from the following results given by way of example. In conventional nibs the ball is retained in its housing by "peening" or "spinning," i.e., the rim encircling the ball is pressed on to the ball either by a single blow using a conical die or by continuous pressure exerted by a set of rollers. Due to elastic recovery a very small but uniform radial clearance between the polished uncratered ball and its seatings is formed by these known methods. Such a clearance is difficult to measure directly but in the case of a specific example of "peened" nib is about 2 to 3 microns when determined by the bubble pressure method described in British patent specification No. 629,283. Tests of a particular specimen with an uncratered polished ball and a viscous ink of about 80 to 100 poises at 25° C. on a writing machine producing a continuous trace at a speed of 8 cm. per second and 170 gram load on the nib, show the average thickness of the ink film on ordinary writing paper to be approximately 0.0001 mm. (0.1 micron).

Taking such a nib (with uncratered polished ball) as a basis for comparison, the use of a cratered ball may increase by at least half and often as much as four-fold the amount of ink deposited on the writing surface under otherwise identical conditions. Bearing in mind what has been said above, this indicates why the depth, the regularity and the continuity of the trace are so much improved.

Figure 4:
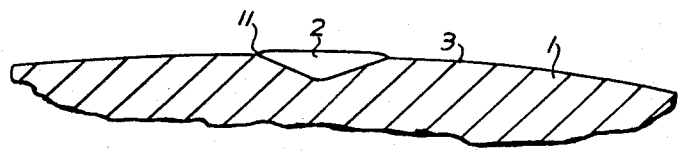
FIG. 4 is a sectional view through a single crater prior to removal of the "burr" around its edge.
Figure 5:
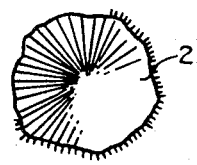
FIG. 5 is a plan view of the crater.

FIG. 4 shows in section a typical crater 2 produced through erosion by a single spark. FIG. 5 shows the plan view of such a crater. By way of example, a crater of about 40 microns diameter and approximately 5 microns depth is produced in a stainless steel ball of 1 mm. diameter by the single discharge of a condenser having a capacitance of 0.1 microfarad charged to 40 volts, with parafin oil at room temperature as a dielectric liquid. Experiments indicate that the volume of metal eroded in forming a single crater is proportional to the electrical energy of a single discharge of the condenser. Thus a capacitance of 0.01 microfarad at 40 volts produces craters of approximately 15 microns diameter and a capacitance of 1.0 microfarad at 40 volts produces craters of approximately 75 microns diameter.

As illustrated in FIG. 4, the spark throws up a thin "burr" 11 around the crater 2. The material forming this "burr" lies above the level of the spherical surface 3 but as it is very brittle it can be easily removed by any suitable "deburring" method, e.g., rolling between hard plates, tumbling, lapping, polishing, or the like.

Figure 6:
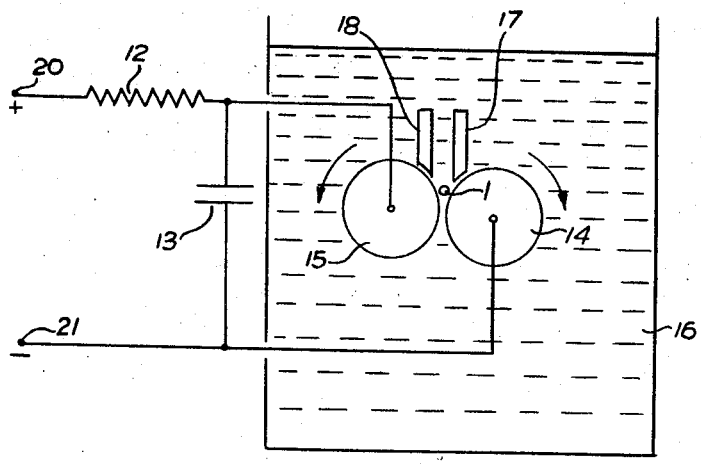
FIG. 6 is a diagram of a suitable arrangement for carrying out the spark erosion method of this invention.

FIG. 6 shows schematically a suitable arrangement for producing a cratered ball by a succession of single spark discharges. A direct current supply of electricity, e.g., at 40 volts, is connected to the circuit at 20, 21 and is fed through a resistance 12 to a condenser 13 acting as the store of electrical energy. The output from the condenser is coupled to a pair of electrodes 14 and 15 consisting of parallel rollers rotating as indicated at a speed of, for example, 150 r.p.m. The rollers may be of brass and have a diameter of one-half to three-quarters of an inch; they are separated by a gap of say 0.020 inch (0.5 mm.) when sparking at 1 mm. ball. They are totally immersed in a liquid dielectric 16 such as paraffin oil. Scrapers 17, 18 made of electrically insulating material and running the full length of the rollers prevent the ball 1 to be treated from being carried away by the movement of the liquid or of the rollers when the latter are rotating. The pumping action of the rollers assists in preventing the ball from short circuiting the gap between them and induces a teetering movement of the ball close to the face of each roller.

As each ball 1 approaches the rollers 14, 15, it reaches a point where the dielectric strength of the liquid 16 is insufficient to prevent an electrical discharge taking place from roller 14 via the electrically conductive ball to the roller 15 and that discharge then takes place. The energy dissipated during the electrical discharge tends to repel the ball from the rollers and, because of the change in orientation of the ball caused by rotation of the rollers, a subsequent discharge occurs at a different point on the surface of the ball. But though the circuit is so designed that the condenser 13 is capable of a spark frequency of many thousands per second, the arrangement is such that, in all but exceptional circumstances, only one single discharge occurs at a time and not a rapid succession of a multiplicity of discharges.

The fundamental reason for this behavior is that the ball 1 is completely free to move away from the electrodes 14, 15 under any force acting on it. It is, therefore, thought that the explosive nature of the spark which no doubt vaporizes a minute quantity of the dielectric liquid 16 supplies the force which ejects the ball from the proximity of the roller surface, thus increasing the gap beyond the breakdown limit for the subsequent spark. The latter, therefore, only occurs when the ball falls back on to the rollers, by which time a different part of the ball surface is exposed to cratering. The peripheral speed of the rollers 14, 15, is such that movement of the liquid 16 near the surface of the rollers produces sufficient viscous effect to tend to lift the ball and maintain a small clearance between the ball and the rollers. The condition is such that in general the ball neither touches the rollers nor is too far from the surfaces of the rollers for electrical discharges to take place. Thus, after a given time the ball is covered, to the extent desired, with a multiplicity of single craters of substantially uniform size. The craters are thoroughly distributed, but in a somewhat random manner, over the whole exterior of the ball so as to reticulate its spherical surface. Here and there two adjacent craters may merge but substantially all of them are individually surrounded by the smooth outer surface of the ball. Their size depends on the applied voltage and the capacity of the condenser. A succession of balls may be treated by rolling them along the gap between the electrodes, in which motion each ball is rotated and the distribution of the craters over its surface facilitated.

In the apparatus shown in FIGS. 7A to 10, two parallel rollers 14 and 15 are rotatably journaled in non-conducting end plates 22, 23 connected in spaced relation by distance rods 24. The rollers rotate in the direction of the arrows shown in FIG. 10 with a small gap between them, being driven from electric motor 25. Conveniently, this motor 25 drives the roller 15 through worm and wormwheel gearing 26 and the two rollers are geared together by gearing 28. The balls 1 which have a diameter larger than the gap between the rollers 14 and 15 are supplied to the rollers from a magazine 29 by a feed pipe 30. They are supplied at appropriate intervals by a rotatable pick-up disc 31 in the base of the magazine 29, said pick-up disc having spaced ball-receiving notches or pockets 32 in its periphery and being driven from motor 25 or another motor by gearing comprising a reduction gear box 33 and equal bevel gears 33'.

As shown in FIG. 7A the base of the magazine 29 and the pick-up disc 31 are inclined. In the lower part of the magazine the balls 1 insert themselves into the recesses 32 and are carried up to a higher point at which each recess, in turn, registers with the entry end of tube 30 so that each ball gravitates from its recess down the tube to the gap between the two rollers. The rollers are inclined, conveniently at an angle of 1° or 2°, so that as they rotate in the direction of the arrows (FIG. 10) the balls 1 roll in spaced relation along the rollers until at the left-hand end of the apparatus they pass down a discharge spout 34. The scrapers 17' and 18' consist of nylon filaments strong between the end plates 22, 23.

The inclination of the rollers ensures that the balls pass along the rollers from right to left as viewed in FIGS. 7A and 7B, ultimately to enter the discharge spout 34 and fall into a receptacle provided for the purpose. The precise angle of inclination of the rollers determines how long each ball stays on the rollers—which period may be of the order of several minutes. There is sometimes a tendency, especially when large condensers are used, for the ball to adhere slightly to one or other of the rollers after an electrical discharge. Therefore, in order to prevent such a ball from being carried away from the gap between the rollers, the scrapers 17' and 18' are provided near the surface of each roller as shown in FIG. 10. These scrapers rub against the surface of the respective roller and pick any adherent balls off the surface of the rollers in order that they may fall back towards the gap and undergo further cratering.

Current is supplied through leads 20', 21' connected to terminals 36, 37 which supply the respective rollers 14, 15 through brush gear. For each roller the brush gear may be of the form shown in FIG. 9 in relation to the roller 15. It consists of a brush 38 supplied from terminal 37 by, and pressed against the end of the roller 15 by, a spring contact 39.

The rollers 14, 15 may rotate at the same or slightly different peripheral speeds. If the two rollers rotate at slightly different speeds, there is imparted to the balls some rotation transverse to the axes of the rollers. This assists in producing a uniform coverage of craters on the surface of the balls as they pass along the rollers. In a specific example the peripheral speed of roller 14 is 24 feet per minute and that of roller 15 is 20 feet per minute, and the balls 1 (being 1 mm. diameter) are supplied at an approximate rate of one per second. For this purpose the rollers are 0.680 inch diameter, the motor 25 rotates at 3400 r.p.m., the ratio of reduction gearing 26 is 25:1 and that of reduction gearing 28 is 6:5, the ratio of gear box 33 is 900:1, and the pick-up disc 31 has sixteen pockets 32. The rollers 14, 15 may be 15½ inches long. This apparatus is intended to be supported in a bath of liquid dielectric 16 such as paraffin, for example, the level of which is such that the rollers are totally immersed.

The electrical apparatus may be housed in casing 40. As shown, it consists of a series of condensers 13a–13e, the capacitance of which increases in steps from 0.01 microfarad for condenser 13a to 1 microfarad for condenser 13e and a series of resistances 12a–12e the value of which decreases in steps from 9.1 kilohms for resistance 12a to 125 ohms for resistance 12e, together with a suitable switch 41 for introducing into the circuit the selected condenser and the resistance appropriate to it. A volt-meter 42 may be incorporated. The electrical discharge phenomenon produced by this circuit can occur at a high frequency since the condenser is capable of charging and discharging many thousands of times per second. With the apparatus shown, which in corporates rollers 15½ inches long, there may be as many as 80 or 100 balls on the rollers at any one instant, all of these participating in the cratering process. On rare occasions it has been found that a pair of adjacent balls have touched together during their passage along the rollers and have consequently welded together. Thereafter, such a pair of balls have suffered cratering in the form of bands which destroy their spherical shape. To overcome this positive means may be provided for moving the balls along the rollers while maintaining them in spaced relation, instead of allowing them to gravitate along the rollers. For this purpose, as shown in FIGS. 12 and 13, one roller 14' may be provided with a screw thread 43 in which the balls 1 are deposited. Each ball remains in this thread groove throughout its period between the rollers and therefore advances along the rollers at a steady rate which is governed by the pitch of the screw thread and the speed of roller rotation. In the arrangement shown, the balls drop into alternate grooves of the screw thread thereby eliminating any risk of contact between adjacent balls. For 1 mm. balls the pitch of this screw thread may be 1 mm. and the included angle of its flanks 60°. In a convenient construction the roller 15 has a 0.68 inch diameter and the roller 14 has an 0.70 inch crest diameter and a 0.652 inch root diameter and the peripheral gap between the two rollers is between 0.01 inch and 0.015 inch. Roller 14' rotates at 120 r.p.m. and roller 15 at 144 r.p.m., the ball feed being at the rate of 1 per second, i.e., one ball for every two revolutions of roller 14'.

Although the invention has been described above with reference to specific embodiments, many variations and modifications therein will occur to those skilled in the art. Accordingly, it is intended that all such variations and modifications be included within the scope of the following claims.

We claim:

1. A method for preparing a cratered ball comprising the steps of supporting an electrically conductive sphere on two electrodes having adjacent surface portions spaced by a distance less than the diameter of the sphere so that the sphere is free to move away from the electrodes under the mechanical influence of an electrical discharge, causing a series of electrical discharges to pass through the sphere, and changing the orientation of the sphere with respect to the electrode surface portions after each discharge.

2. A method according to claim 1 wherein the adjacent electrode surface portions extend in a generally horizontal direction and including the step of moving the adjacent surface portion of at least one of the spaced electrodes in the upward direction to cause the sphere to change its orientation with respect to the surface portions after each discharge.

3. A method according to claim 2 wherein the adjacent surface portions are parallel and including the step of moving the sphere in the direction parallel to the adjacent surface portions to cause the craters formed by the electrical discharges to be distributed substantially uniformly over the surface of the sphere.

4. Apparatus for preparing cratered balls comprising a container holding a quantity of dielectric liquid, a pair of electrodes having adjacent surface portions immersed in the liquid and spaced by a predetermined distance, drive means for continuously moving at least one of the adjacent surface portions in the upward direction, ball feed means for supplying electrically conductive balls having diameters greater than the predetermined distance to the space between the adjacent electrode surface portions, scraper means adjacent to the electrode surface portions preventing the moving surface portions from carrying a ball away from the space between the portions, and electric circuit means supplying potential to the two electrodes sufficient to form craters of predetermined size in a ball when an electric discharge passes through a ball in the space between the two adjacent surface portions.

5. Apparatus according to claim 4 wherein the adjacent surface portions of the two electrodes are parallel, the electrodes are inclined slightly with respect to the horizontal, and the ball feed means supplies balls at the higher end of the electrodes, thereby permitting the balls to be moved by gravity along the adjacent surface portions by gravity.

6. Apparatus according to claim 4 wherein the electrodes are generally cylindrical in shape and are parallel and one of the electrodes has a screw thread formed in its outer surface adapted to receive each ball and move it longitudinally along the space between the electrodes as the threaded electrode is rotated.

7. Apparatus according to claim 4 wherein the dielectric liquid has a viscosity such that the film of liquid adjacent the moving electrode surface tends to urge a ball away from the space between the adjacent electrode surface portions.

8. Apparatus according to claim 4 wherein the drive means moves both of the adjacent surface portions in the upward direction at slightly different speeds.

9. A method for preparing a cratered ball comprising the steps of positioning an electrically conductive sphere in close proximity to two electrodes having adjacent surface portions spaced by a distance less than the diameter of the sphere, passing an electrical discharge through the sphere so as to produce craters in the surface portions of the sphere adjacent to the electrodes, permitting the sphere to move away from the electrodes by the mchanical influence of the electrical discharge, changing the orientation of the sphere to place different surface portions which are spaced from the cratered surface portions in close proximity to the electrodes, and passing another electrical discharge through the sphere to produce craters in the different surface portions of the sphere.

References Cited in the file of this patent
UNITED STATES PATENTS

| | | |
|---|---|---|
| 2,850,618 | Rudorff | Sept. 2, 1958 |
| 2,974,215 | Inove | Mar. 7, 1961 |

UNITED STATES PATENT OFFICE
CERTIFICATE OF CORRECTION

Patent No. 3,145,286                      August 18, 1964

Hans Reinhard Fehling et al.

It is hereby certified that error appears in the above numbered patent requiring correction and that the said Letters Patent should read as corrected below.

Column 1, line 38, after "609,817." insert the following paragraph:
> This application is a division of
> our copending United States application
> Serial No. 29,608, filed May 17, 1960,
> for "Ball-Tip Writing Instrument and
> Ball Therefor".

same column 1, line 56, after "such" insert -- a --; column 2, line 5, for "gloubles" read -- globules --; column 4, line 45, after "ink" insert a closing parenthesis; column 5, line 15, before "room" insert an opening parenthesis; column 7, line 51, for "parafin" read -- paraffin --; line 58, for "75" read -- 70 --; column 8, line 1, for "at" read -- a --; column 9, line 13, for "utlimately" read -- ultimately --; line 66, for "in corporates" read -- incorporates --; column 12, line 6, for "mchanical" read -- mechanical --.

Signed and sealed this 1st day of December 1964.

(SEAL)
Attest:

ERNEST W. SWIDER                              EDWARD J. BRENNER
Attesting Officer                             Commissioner of Patents